United States Patent [19]

Daimer et al.

[11] Patent Number: 4,614,783

[45] Date of Patent: Sep. 30, 1986

[54] SELF-CROSSLINKING CATHODICALLY DEPOSITABLE ED-BINDERS CONTAINING MODIFIED PHENOL NOVOLAKS

[75] Inventors: Wolfgang Daimer; Johann Gmoser; Rudolf Schipfer, all of Graz, Austria

[73] Assignee: Vianova Kunstharz, A.G., Werndorf, Austria

[21] Appl. No.: 591,590

[22] Filed: Mar. 20, 1984

[30] Foreign Application Priority Data

Mar. 21, 1983 [AT] Austria .................................. 975/83

[51] Int. Cl.[4] ................................................ C08G 8/36
[52] U.S. Cl. ................................. 525/504; 204/181.7; 525/507; 528/73; 528/85
[58] Field of Search .................. 525/504, 507; 528/85, 528/73; 204/181-187

[56] References Cited

U.S. PATENT DOCUMENTS

| | | | |
|---|---|---|---|
| 3,043,794 | 7/1962 | Feiler et al. | 528/85 X |
| 3,409,579 | 11/1968 | Robins | 525/504 X |
| 3,538,040 | 11/1970 | Grazen | 525/504 X |
| 4,107,229 | 8/1978 | Tideswell et al. | 525/504 X |
| 4,147,676 | 4/1979 | Pampouchidis | 528/73 X |
| 4,278,580 | 7/1981 | Schmölzer et al. | 528/73 X |
| 4,282,128 | 8/1981 | Pampouchidis et al. | 528/73 X |
| 4,311,815 | 1/1982 | Heine | 525/504 |
| 4,358,570 | 11/1982 | Tobinaga | 525/504 X |
| 4,367,319 | 1/1983 | Pampouchidis et al. | 525/504 |
| 4,444,634 | 4/1984 | Kempter et al. | 525/504 X |
| 4,517,343 | 5/1985 | Schupp et al. | 525/504 X |
| 4,539,372 | 9/1985 | Paar | 525/504 X |
| 4,563,515 | 1/1986 | Schipfer et al. | 525/504 X |

OTHER PUBLICATIONS

Encyclopedia of Chemical Technology, vol. 15, 2nd edition, 1969, pp. 190-197, Kirk et al.

*Primary Examiner*—Howard E. Schain
*Attorney, Agent, or Firm*—A. W. Breiner

[57] ABSTRACT

Cathodically depositable self-crosslinking binders for electrodeposition based on alkylphenol novolaks wherein an alkylphenol novolak having a molecular weight of at least 500 and a hydroxyl value of between 100 and 700 mg KOH/g, modified through self-condensation or etherification of the phenolic hydroxy groups, obtained through a reaction catalyzed with an acid (component A), is reacted simultaneously or separately with (B) amines which carry a tertiary amino group and at least one hydroxy group or primary or secondary amino group (component B) and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g is described. The binders are internally plasticized to provide increased flexibility of coatings prepared from the binders which are essentially chip resistant.

17 Claims, No Drawings

SELF-CROSSLINKING CATHODICALLY DEPOSITABLE ED-BINDERS CONTAINING MODIFIED PHENOL NOVOLAKS

The present invention is directed to cathodically depositable self-crosslinking binders for electrodeposition coatings (CED) based on phenol novolaks, and to a process of producing the binders.

A substantial number of CED binders is known in the prior art disclosing the use of a variety of raw materials and methods of production, for example as disclosed in "Advances In Electropainting 1978 -1980" of R. H. Chandler Ltd., March 1981. In practice it has been established that only a relatively small number of raw materials can be used in the manufacture of anti-corrosive primers. Useful materials include the epoxy resins such as the di- or polyglycidyl ethers of bisphenols or phenol novolaks. Although anti-corrosive cationic binders based on bisphenolglycidyl ether resins are obtained substantially meeting the technical requirements of the binders, they still have the known disadvantages of unsatisfactory tooling characteristics, unless they are properly plasticized. A particular disadvantage of such binders is the unsatisfactory chip resistance of the cured coating. Satisfactory chip resistance is a major exigency for automobile coatings.

It is the object of the present invention to provide self-crosslinking cationic binders with properties and a performance which meets the requirements for automobile coatings. Surprisingly, this objective can be accomplished by employing modified phenol novolaks as the basic compound in synthesizing the cationic resin condensation product, the phenolic hydroxy groups of which are partially or totally etherified. The use of these raw materials permits the internal plasticizing of the binders and, in turn, substantially increases the flexibility of the cured films which is essential in chip-resistance coatings.

The present invention, therefore, is concerned with a process for producing cathodically depositable self-crosslinking binders for electrodeposition based on modified phenol-novolaks, and to the binders obtained. The binders are characterized in that a phenol-novolak of alkyl phenols and optionally phenol and formaldehyde having a molecular weight of at least 500 and a hydroxyl value of between 100 and 700 mg KOH/g, modified through self-condensation and/or total or partial etherification of the phenolic hydroxy groups, obtained through a reaction catalyzed with an acid (component A), is reacted simultaneously or separately with (B) amines, which carry a tertiary amino group and at least one hydroxy group and/or primary or secondary amino group (component B), and (C) aromatic and/or aliphatic and/or cycloaliphatic di- or polyisocyanates (component C), the weight ratios being chosen in order that per mole of component (B) 2 to 4 NCO-equivalents of component (C) are present and the isocyanate-group-free reaction product has an amine value of between 40 and 120 mg KOH/g. According to this invention, binders are obtained which are free from saponifiable ester groups and which therefore exhibit superior stability in an aqueous medium. As a result of the splitting-off of part of the amine during crosslinking, the number of the sites which can be attacked by chemical influences is substantially reduced.

The improved coatings of this invention are particularly surprising in that the known CED binders based on phenol-formaldehyde condensation products, for example those with the structure of MANNICH-bases, could not meet the needs of the automobile industry with regard to the necessary protection against corrosion, required of the primer for a car body. Furthermore, such products, during the curing reaction, release relatively large quantities of hazardous products during the curing reaction.

Suitable materials for use as component (A) are the modified phenol novolaks having an average molecular weight of at least 500 and a hydroxyl value of from 100 to 700 mg KOH/g. The hydroxyl value refers to both alcoholic and phenolic hydroxy groups. The novolaks are substantially prepared from alkylphenols, but may optionally also contain phenol. Alkylphenols, as used herein, include the ortho-, meta-, and para-substituted products of phenol with straight chain or branched alkyl radicals. Compounds of this class are isomeric cresols, xylenols, butyl-, amyl-, octyl-, or nonyl-phenols, or mixtures thereof. The compounds preferred in the process of the invention are the ortho- and para-substituted phenols. Particularly preferred are those alkylphenols with from 4 to 10 C-atoms in the alkyl radical, such as p-tert.butylphenol, amylphenol, octylphenol, or nonylphenol.

The formaldehyde is reacted with the alkylphenol to provide novolak formation in the presence of acidic substances. Methods and reaction mechanisms for the preparation of these condensates are known to those skilled in the art and need no further explanation. It is essential for the process of the invention that neither salts nor water are present in component (A). The ratio between formaldehyde and alkyl phenol is, in general, not critical and depends on the desired molecular weight of the condensate. The preferred quantity is 0.2 to 1.2 moles of formaldehyde for each receptive site. In modifying the novolaks, the phenolic hydroxy groups are partially or totally etherified. In the simplest way, the etherification reaction is carried out by reacting the novolak with monoepoxy compounds in the presence of suitable catalysts such as alkalies or $BF_3$- complexes. The etherification may be carried out in known manner with benzyl chloride, dichlorodiethyl ether, or allyl chloride. The preferred compounds are monoepoxy compounds, such as ethylene oxide, propylene oxide, styrol oxide, 2,3-epoxypropanol-1, or glycidylethers or glycidyl esters. The epoxy compounds particularly preferred are the glycidyl esters of KOCH-acids, especially those with from 9 to 11 C-atoms. Similarly, the phenolic hydroxy group may be etherified by reacting it with dioxolon-2 (ethylene carbonate) or 4-methyldioxolon-2 (propylene carbonate).

Suitable materials for use as components (B) are (cyclo)aliphatic amines carrying a tertiary amino group and at least one hydroxy group and/or a primary or secondary amino group. Examples are N,N-dimethylaminoethanol; N,N-diethylaminoethanol; 2-dimethylamino-2-methyl-1-propanol; N,N-diethylpropane-1,3-diamine; N,N-2,2-tetramethylpropane-1,3-diamine; 3-dimethylamino-2,2-dimethylpropane-1-ol; cyclohexyldiethanolamine; methyldiethanolamine; 2-(2-hydroxyethoxy)ethylamine-1; and 4-(2-hydroxyethyl)morpholine.

Suitable materials for use as components (C) are aromatic, cycloaliphatic or aliphatic diisocyanates or polyisocyanates. Examples are 1,6-diisocyanatohexane; 1-isocyanato-3-isocyanato-methyl (3,5,5-trimethyl)-cyclohexane (=isophorone diisocyanate); 2,4- diisocyanatotoluol; 2,6-diisocyanatotoluol; 4,4'-diisocyanatodiphenylmethane =MDI; or the corresponding 2,4' and 2,2' isomers. Those diisocyanates are preferred wherein the NCO-groups have a different reactivity, such as with toluylene diisocyanate (isomer blend available on the market), cyclohexylene diisocyanate, or isophorone diisocyanate.

The reaction between components (A), (B), and (C) is carried out in order that components (A) and (B) are blended, optionally in the presence of inert solvents, and component (C) is slowly added while stirring. It is also possible to prepare a basic intermediate with free isocyanate groups of components (B) and (C) at room temperature, while cooling and to react it at moderately increased temperature with component (A) to consume all isocyanate groups. In another, but less preferred embodiment, components (A) and (C) are blended and then component (B) is added.

The quantities of the reaction partners are chosen in order that the reaction product, calculated on non-volatile substance, has an amine value, DIN 53 176, of from 40 to 120 mg KOH/g. For each mole of component (B), 2 to 4 moles of isocyanate groups of component (C) are employed. An eventual excess of isocyanate groups serves for linking the molecules with the isocyanate-reactive groups of component (A). The quantity and constitution of component (A) are chosen in order that a reaction masking all of the isocyanate groups not consumed for linking the amine component is safeguarded.

The presence of an inert solvent, such as xylol or methylisobutylketone, during the reaction is preferred. When the reaction is completed, it is advantageous to vacuum-strip the solvent. Subsequently, alcohol solvents such as ethanol, (iso)-propanol, or glycol ethers such as ethylene glycolmonoethyl ether, or ethylene glycol monobutylether can be added to obtain a solids content of from 50 to 90% and to reduce the viscosity.

Further processing of the binders of the invention is effected in known manner, such as neutralization with formic acid, acetic acid, or lactic acid; addition of catalysts and inhibitors, and pigmentation; and dilution with water to achieve a cationic electrodeposition bath. Conditions for deposition and curing of the paint films are also known to those skilled in the art. The curing temperatures for the products prepared according to the invention range from 150° to 200° C., preferably 160°–180° C.

The following examples illustrate the invention without limiting its scope. Percentages and weights refer to weight units, unless otherwise stated. Viscosities are given as Gardner-Holdt Standard (GH).

EXAMPLE 1

120 g of xylol, 440 g of nonyl phenol, 209 g of phenol (90% in water) and 7 g of concentrated hydrochloric acid are blended with stirring. At 80° C., within the period of one hour, 250 g of formaldehyde, 36%, are added. The turbid reaction product is stirred at 90° C., until the content of free formaldehyde has fallen to below 0.8%. With rising vacuum, 235 g of water distill off, with the refluxing xylol serving as entraining agent. The resin, now clear, is diluted with xylol to a solids content of 67% of resin solids.

717 g of this resin solution are blended with 0.66 g of borotrifluoride etherate and 162 g of a glycidyl ester of branched $C_9$–$C_{11}$ monocarboxylic acids and heated to 120° C. After 90 minutes, the content of oxirane groups has fallen to 0.03 meq/g. The viscosity of a sample of 9 g of resin solution and 2 g of xylol is M (GH). The thus obtained component (A) has an average molecular weight of 900 and a hydroxyl value of 250 mg KOH/g. At 60° C., 307 g of xylol and 130 g of N,N-diethyl-daminopropane-1,3-diamine are added. Within 30 minutes, a blend of 174 g of toluylene diisocyanate and 116 g of xylol is continuously added in drops. The reaction mixture is heated to 80° C. The content of free isocyanate groups is practically zero, the amine value of the resin (solids) is 53 mg KOH/g. 488 g of xylol are vacuum-stripped at 120° C., and the resin is diluted with 400 g of ethyleneglycol monobutylether.

The yellowish-brown clear product is dilutable with water upon neutralization with formic acid to a slightly turbid solution with 10% resin solids content. Processing and deposition of the resin provides films having excellent performance characteristics regarding surface flexibility and degree of crosslinking. Paints, pigmented appropriately, exhibit excellent corrosion resistance, also on untreated steel.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cathodically depositable self-crosslinking binders for electrodeposition based on modified phenol novolaks, characterized in that an alkylphenol novolak having a molecular weight of at least 500 and a hydroxyl value of between 100 and 700 mg KOH/g, which has undergone total or partial etherification of the phenolic hydroxy groups and is substantially free of oxirane groups, obtained through a reaction catalyzed with an acid (component A), is reacted simultaneously or separately with (B) amines which carry a tertiary amino group and at least one hydroxy group or primary or secondary amino group (component B) and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g.

2. Process according to claim 1, further characterized in that said novolak of component (A) includes phenol.

3. Process according to claim 1, further characterized in that in component (A) ortho- or para-substituted alkyl phenols with from 4 to 10 C-atoms in the alkyl radical are used to form the condensate.

4. Process according to claim 1, further characterized in that monoepoxy compounds are used for etherification of the phenolic hydroxy groups of component (A).

5. Process according to claim 4, further characterized in that the monoepoxy compound is a 2,3-epoxypropanol-1, an alkylene oxide, or glycidyl esters of monocarboxylic acids with from 6 to 35 C-atoms.

6. Process according to claim 1, further characterized in that the phenolic hydroxy groups of component (A) are etherified by reaction with dioxolon-2 (ethylene carbonate) or 4-methyldioxolon-2 (propylene carbonate).

7. Process according to claim 1, further characterized in that components (A) and (B) are blended, and component (C) is slowly added at from 50° to 70° C. while stirring, and the reaction is continued until an NCO-value of substantially zero at 80° C. is obtained.

8. Process according to claim 1, further characterized in that components (A) and (B) are blended in the presence of an isocyanate-inert solvent, and component (C) is slowly added at from 60° to 80° C. while stirring, and the reaction is continued until an NCO-value of substantially zero at 80° C. is obtained.

9. Process according to claim 1, further characterized in that component (A) is reacted with a reaction product of components (B) and (C), carrying one free isocyanate group.

10. Cathodically depositable self-crosslinking binders for electrodeposition based on modified phenol novolaks comprising the reaction product of (A) an alkyl-phenol novolak having a molecular weight of at least 500 and a hydroxyl value of between 100 and 700 mg KOH/g, which has undergone total or partial etherification of the phenolic hydroxy groups and is substantially free of oxirane groups, obtained through a reaction catalyzed with an acid (component A); (B) amines which carry a tertiary amino group and at least one hydroxy group or primary or secondary amino group (component B), and (C) aromatic or aliphatic or cycloaliphatic polyisocyanates (component C), the weight ratio of components being chosen in order that for each mole of component (B) 2 to 4 NCO-equivalents of component (C) are present and that the resultant isocyanate-group-free reaction product has an amine value of between 40 and 120 mg KOH/g.

11. The binder according to claim 10 wherein said novolak of component (A) includes phenol.

12. The binder according to claim 10 wherein in component (A) ortho- or para-substituted -alkyl phenols with from 4 to 10 C-atoms in the alkyl radical are used to form the novolak.

13. The binder according to claim 10 wherein monoepoxy compounds are used for etherification of the phenolic hydroxy groups of component (A).

14. The binder according to claim 13 wherein the monoepoxy compound is a 2,3-epoxypropanol-1, an alkylene oxide, or glycidyl esters of monocarboxylic acids with from 6 to 35 C-atoms.

15. The binder according to claim 10 wherein the phenolic hydroxy groups of component (A) are etherified by reaction with dioxolon-2 (ethylene carbonate) or 4-methyldioxolon-2 (propylene carbonate).

16. The binder according to claim 10 wherein components (A) and (B) are blended, and component (C) is slowly added at from 60° to 80° C. while stirring, and the reaction is continued until an NCO-value of substantially zero at 80° C. is obtained.

17. The binder according to claim 10 wherein components (A) and (B) are blended in the presence of an isocyanate-inert solvent, and component (C) is slowly added at from 60° to 80° C. while stirring, and the reaction is continued until an NCO-value of substantially zero at 80° C. is obtained.

* * * * *